US005671538A

United States Patent [19]

Lautenschläger

[11] Patent Number: 5,671,538

[45] Date of Patent: Sep. 30, 1997

[54] ASSEMBLY JIG FOR ATTACHING TO A CABINET CARCASE HINGES PREVIOUSLY ATTACHED TO A DOOR

[75] Inventor: Horst Lautenschläger, Reinheim, Germany

[73] Assignee: MEPLA-Werke Lautenschläger GmbH & Co. KG, Germany

[21] Appl. No.: 593,142

[22] Filed: Feb. 1, 1996

[30] Foreign Application Priority Data

Nov. 25, 1995 [DE] Germany ....................... 295 18 683 U

[51] Int. Cl.$^{6}$ ............................... F05D 11/00; G01B 3/00

[52] U.S. Cl. ................................ 33/194; 33/613; 33/645; 269/909

[58] Field of Search .............................. 33/667, 194, 197, 33/613, 645, 562; 269/236, 905, 909

[56] References Cited

U.S. PATENT DOCUMENTS

| | | | |
|---|---|---|---|
| 1,540,991 | 6/1925 | Holmgren | 33/194 |
| 2,256,554 | 9/1941 | Epstein | 33/645 |
| 3,144,719 | 8/1964 | Ceravolo | 33/194 |
| 3,249,351 | 5/1966 | Smith | 269/236 |
| 4,060,905 | 12/1977 | Light | 33/194 |
| 4,143,443 | 3/1979 | Reyle | 33/197 |
| 4,805,505 | 2/1989 | Cantlin | 33/613 |
| 4,873,769 | 10/1989 | Casanave | 33/667 |
| 5,327,616 | 7/1994 | Lautenschlager | 16/382 |
| 5,375,292 | 12/1994 | Lautenschlager et al. | 16/249 |

*Primary Examiner*—Thomas B. Will

*Attorney, Agent, or Firm*—Londa and Traub

[57] ABSTRACT

A jig for hanging doors with preinstalled hinges on the stiles of cabinet carcases, wherein the hinge has a mounting plate which is to be placed on the front edge of the stile and fixed in the correct position on the stile. The jig has a body which can straddle the edge of the stile and be held in place by a cam action. It has at least one recess in an end of its portion straddling the stile, the width of the recess being at least equal to the width of the mounting plate and its depth substantially equal to the thickness of the mounting plate.

11 Claims, 2 Drawing Sheets

ASSEMBLY JIG FOR ATTACHING TO A CABINET CARCASE HINGES PREVIOUSLY ATTACHED TO A DOOR

BACKGROUND OF THE INVENTION

The invention relates to a jig for attaching hinges which have previously been attached to a door to the edges of stiles projecting from a lateral wall of a cabinet carcase, wherein the hinge has a mounting plate which can be placed on the edge of the stile and fixed in the correct position thereon.

In furniture manufacture, to be able to affix the mounting plate of such hinges on the stile in the simplest manner, tabs are scored, as a rule, on the front and inside margins of the mounting plate and bent more or less at right angles, and when installed they overlap the front and back sides of the stile.

For the preliminary fixation of the mounting plate on the stile, together with the door hanging thereon, it is known (U.S. Pat. No. 5,327,616) to provide sharpened projections on the inside tabs, which upon installation are forced into the back of the stile by the weight of the door and hold the hinge and door temporarily in place until a screw is driven through a hole in the mounting plate into the stile. If the hole is in the form of a slot, the door can be aligned along the stile when the screw is not fully driven home or is slightly backed out. The knife-edged projections on the projecting tabs then prolong the indentation that is thus produced in the back of the frame, but as a rule this is acceptable since these indentations are not easily seen from the outside. However, indentations or scratches which are caused by the tabs on the edge of the stile may be less tolerable if they become visible when the door is shifted for precise alignment with the cabinet.

The hinges described above have therefore been improved so that the outer tabs and the knife-edge projections on the inner tabs can be dispensed with, thereby avoiding damage to the front and back of the stile during installation (U.S. Pat. No. 5,375,297). The holding function performed in the older hinge by the outside tabs is then performed by a screw pre-installed in the edge of the stile but only partially driven in, against which the outer edge of the mounting opening, also in the form of a slot, abuts when the mounting plate is to be shifted into the carcase interior past the proper position. The bent tabs still provided on the carcase-interior margin assure the alignment of the mounting plate on the stile in the event of forces acting in the opposite direction, and cuts are no longer produced in the back of the stile, because the knife edge-like projections that cause these cuts in the older hinge are eliminated. In order to be able to place this known hinge on the stile in spite of the preinstalled screw, a special configuration of the fastening hole is necessary, with an additional introduction slot running from the fastening hole to the end limit inside the carcase, and the mounting procedure must be performed in a special manner, such that first the partially driven screw is passed through the introduction slot and then the mounting plate is placed on the outside edge of the stile. By driving the screw further in, but without tightening it, the head of the screw is brought so close to the upper side of the mounting plate that the latter can still be aligned on the stile within the length established by the slot, but still can no longer be raised up enough to enable the free ends of the inside tabs to move past the edge surface of the stile.

SUMMARY OF THE INVENTION

The invention is addressed to the problem of creating a simple, inexpensive and fool-proof assembly jig for attaching hinges of the kind here in question to stiles, which will make it possible to attach the hinges together with the doors on which they are already installed, without first driving a screw into the stile, and without damaging the stile. At the same time, the assembly jig is to assure also a precise alignment of the mounting plate on the stile, so that no further alignment of the installed mounting plate will be necessary.

This problem is solved by the invention in that the jig has a body that can straddle the edge of the stile and can be fastened releasably at its front side and rear side, and at least one recess is provided in the end of its portion straddling the edge, which opens in one of the lateral defining margins of the straddling section, and that the width of the recess is at least equal to the width of the mounting plate, and its depth is substantially equal to the thickness of the mounting plate. The base can then be fastened to the stile such that its recess reaches over at least a part of the mounting plate, thereby holding the latter in contact with the edge of the stile. The weight of the door held by the hinge seeks to tilt the mounting plate away from the stile, but the upper side of the mounting plate presses against the bottom of the recess, so that such tilting is prevented. The final fixation of the mounting plate then is performed by screwing it down with screwdrivers fed with screws automatically from a magazine, whereupon the assembly jig can be removed and reused in mounting a door on the next carcase.

The jig body, in an advantageous embodiment of the invention, is in the form of a profile that is essentially channel-shaped, the space measured between the flanges of the profile being at least equal to the thickness of the stile. This channel-shaped profile can then be made to straddle the stile and be fastened thereto.

The recess or recesses are then provided in the inside surface of the web of the channel confronting the edge of the associated stile.

To avoid the need for later alignment of the door that has been mounted on a carcase by means of the installing jig of the invention, it is recommended that the channel-shaped profile be made long enough so that, when placed in position on the corresponding stile, with its front end remote from the mounting plate abutting the adjacent carcase top or bottom, its recess will cover a portion of the mounting plate, and then that portion of the mounting plate will be held in the recess and the mounting plate will be adjusted to the proper mounting position.

It is expedient to provide a recess for holding mounting plates in the correct mounting position in each of the end portions of the inside of the web of the channel. The jig can then be used to hold the mounting plate of the hinge preinstalled in either the upper or lower area of the door.

For the quick and easy fastening of the jig in the proper position on the stile, it is expedient to provide a clamp means having a jaw which can be made to engage and disengage the back of the stile.

In that case the configuration is then best made such that, in the flange of the channel-shaped profile that is in contact with the back of a stile when in the proper position, an opening is provided in which the jaw, in the form of a lever, is mounted so as to pivot between two positions such that the end of the lever is withdrawn into the recess in the one end position, but when swung into the other end position it protrudes increasingly out of the recess into the space between the flanges. The clamping of the assembly jig is therefore performed on the back of the stile, which is not visible from the exterior of the carcase, so that any imprint made by the clamping jaw on the frame element will be invisible. On the outer side of the stile, however, the inside surface of the channel flange bears against the inside surface of the other flange on a large area, so that visible imprints on the stile are reliably prevented. In the case of an especially delicate surface on the front edge of the stile, the inside surface of the outer flange of the profile could be provided with an elastic coating which then would reliably prevent any damage to the surface of the stile.

The opening can be made in the web of the channel-shaped profile in such a manner that the lever, made of appropriate length, will protrude above the web in its first end position and will thus be easily accessible to the assembler. It is then recommendable to provide a handle on the free end of the lever.

The end of the lever that is pivoted in the opening is then best rounded over in cross section to prevent the harm that might be done to the back of the stile by a sharp edge when the lever is pushed to its clamping position.

BRIEF DESCRIPTION OF THE DRAWINGS

The invention is further explained in the following description of an embodiment in conjunction with the drawing, wherein.

DETAILED DESCRIPTION OF THE INVENTION

Figure 1:
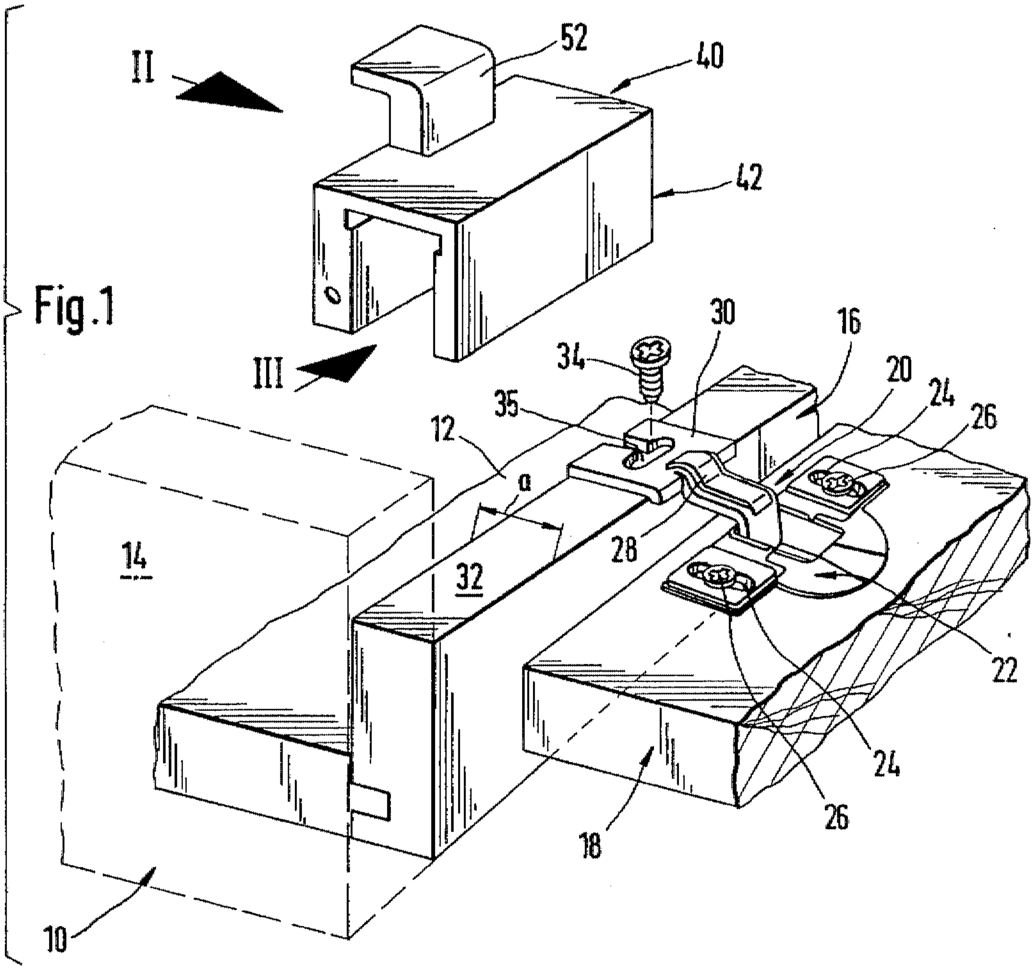
FIG. 1 is a perspective view of a corner area of a cabinet carcase with a stile projecting from the lateral wall, and of the associated corner area of a door with hinges to be hung on the stile, wherein the assembly jig according to the invention is shown in a position above the stile from which it can be lowered onto the stile and fastened thereto.
Figure 2:
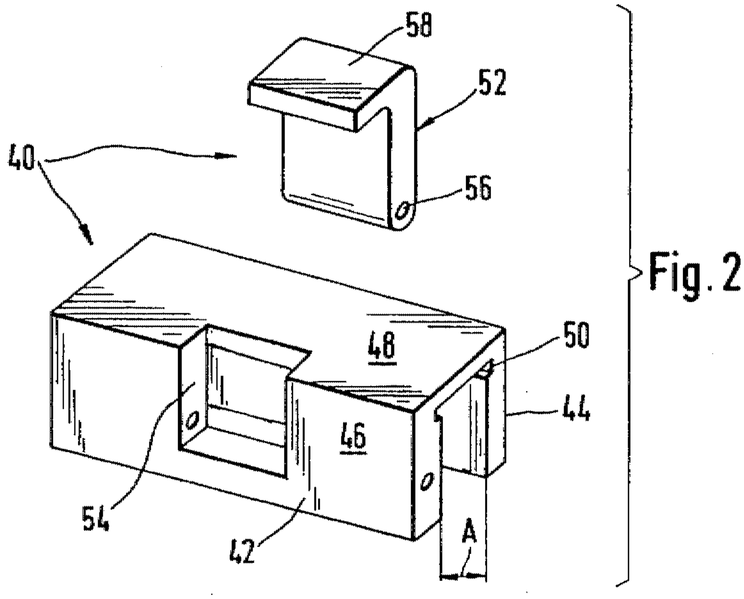
FIG. 2 is a perspective view of the assembly jig seen in the direction of arrow II in FIG. 1, in which the clamp element enabling the jig to be clamped on the stile is shown disassembled and removed from the jig body.
Figure 3:
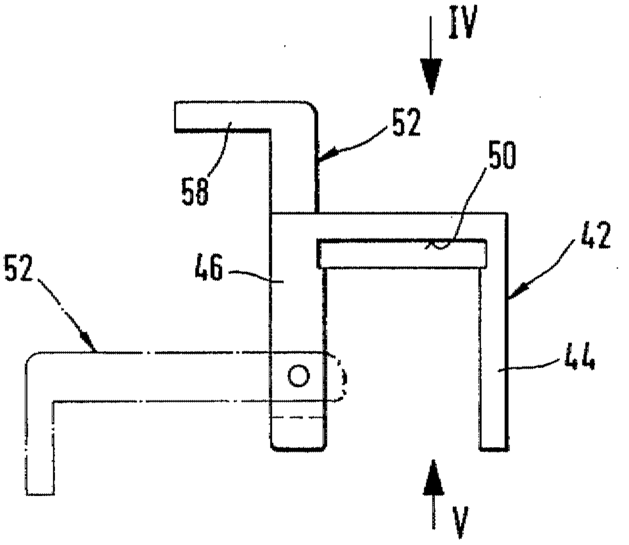
FIG. 3 is a side view of the assembly jig seen in the direction of arrow III in FIG. 1.
Figure 4:
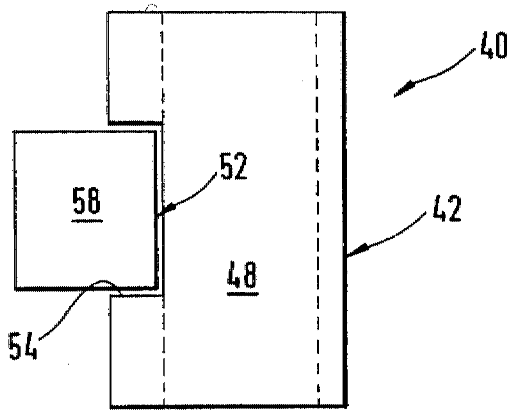
FIG. 4 is a plan view of the assembly jig seen in the direction of arrow IV in FIG. 3.
Figure 5:
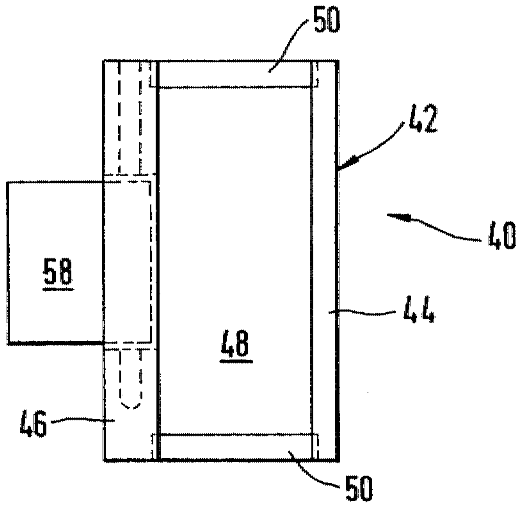
FIG. 5 is a bottom view of the assembly jig seen in the direction of arrow V in FIG. 3.

In FIG. 1 there is shown a corner area, for example the upper left front corner of a cabinet whose carcase, identified generally by 10, is shown in contact with the left lateral wall 12. The upper corner of the cabinet top 14 is indicated only in broken lines. From the side wall 12 a stile (i.e. frame element) 16 extends upward through the entire height of the cabinet, narrowing the width of the usable space within the cabinet. Likewise, only the corner area of the door 18 of the cabinet is shown. The door 18 is to be hung on the stile 16 by two hinges already mounted, only one of which is represented. The hinge 20 has as its door-related member a hinge cup 22 which is usually recessed in a mortise, not shown, in the back of the door and which bears a mounting flange projecting on both sides from the lip of the cup itself. The mounting flange contains slots 24 through which screws 26 are driven into the door 18, only the heads of the screws being visible in the drawing. Inside of the cup 22 there is journaled one end of the supporting arm 28, whose other end is enlarged to form a substantially rectangular, flat mounting plate 30, which is fastened on the edge 32 of the stile 16 by a screw 34. For this purpose a slot 35 is provided in the mounting plate 30, through which a screw can be driven into the edge of the style 16 to affix the mounting plate on the edge 32.

In large series production, the door is hung on the prepared carcase with the latter in the position represented; the carcase 10 is delivered on a conveyor belt and then completed with the door 18 which is provided with the preinstalled hinge 20 and delivered on another conveyor, by bringing the door up to the carcase so that the mounting plates of all the preinstalled hinges 20 are in contact with the edges 32 of the respective stile; then the screws are driven by the assembler with a power screwdriver.

To make it possible thus to affix the mounting plate 30 on the edge 32 with the door in correct alignment with the carcase, without the danger that the door might shift or even fall, the jig 40 represented at the top in FIG. 1 is provided, which serves as a device for aligning the door in the correct position and for installing the hinge 20, and therefore the door, during the assembly procedure. This assembly jig 40 is further described below in conjunction with FIGS. 2 to 5.

The assembly jig 40 has a body 42 which is in the form of a substantially channel-shaped profile of metal. The distance A between the flanges 44 and 46 of the profile is slightly greater than the thickness a of the stile 16. The jig body 42 can therefore be placed over the stile until the inside of its web 48 contacts it. The length of the body is, on the other hand, made such that, when it is in the proper position on the stile, i.e., when its one end abuts the bottom or top 14 of the door opening, just a small portion of the mounting plate is overlapped when the latter is in the intended position on the edge 32 of the stile 16. In this overlap area a recess 50 is provided in the inside of the web, into which the overlapped portion of the mounting plate snugly fits. A recess 50 of this kind is expediently provided at both ends of the jig body 40, so that the assembly jig can be used either on the upper end or on the lower end of the stile.

For the simple and quick placement and removal of the jig body on the stile, a clamping means is provided which has a gripping means in the form of a lever 52. The end at which the lever 52 is journaled inside of the opening 54 has a rounded cross section, and the position of the bore 56 in the lever into which its shaft is inserted is selected such that when the lever 52 is in the raised position it will be within the recess 54 as represented in solid lines in FIG. 3, but when it is turned to the position shown in broken lines in FIG. 3 it protrudes into the interior of the body and then comes into clamping contact with the back of the stile. The size of the recess opening is made such that its bottom edge forms an abutment for the lever in the position of maximum holding force. Simply by turning the lever 52 from the first position to the second the jig body can be fixed on the stile 16. A bend 58 at the upper, free end of the lever 52 forms a handle to facilitate releasing the lever from the engaged position. In the assembling procedure, the inside of the front flange 44 is clamped tightly to the front edge of the stile. To prevent visible damage to the stile, this inside surface of the profile is smoothed—polished for example. Alternatively the inside surface can be covered with a padding of elastically compressible material such as rubber or an elastomeric plastic, so as to avoid the above-mentioned damage to the stile.

It is apparent that modifications and further developments of the described assembly jig are possible within the scope of the invention, with regard not only to the shape and dimensions of the jig body 40 but also to the configuration of the assembly jig 52, 54. Also possible is making the jig body variable in length by providing stops or adjusting screws which can be shifted lengthwise on it and locked at desired positions; then the assembly device becomes usable also in cases wherein the hinges are premounted at different distances from the top and bottom edge of the door.

I claim:

1. A device for aiding in the assembly of a cabinet door to a cabinet carcase by way of a hinge, the hinge to be fastened against a free edge of an elongated, stick-like frame element projecting from a side wall of the cabinet carcase, where the hinge is premountable on the door, the hinge having a mounting plate for placement against the free edge of the frame element for fixation in a proper installed position on the frame element, the device comprising a body adapted for straddling the free edge of the frame element by way of lateral extensions extending from either side of the body, the device being releasably securable against both a front side and rear side of the frame element, the body having at least one first recess extending into a lateral end face of the body, the at least one first recess having a width equal to or greater than a width of the mounting plate and having a height substantially equal to a thickness of the mounting plate.

2. The device according to claim 1, wherein the body has a cross-sectional profile substantially as a U-shape where the lateral extensions form the limbs of the U extending from a web, a clear distance measured between the limbs being at least equal to the thickness of the frame element measured between the front side and the rear side.

3. The device according to claim 2, wherein the at least one first recess is provided in an inside surface of the web, which inside surface is adapted to lie against the free edge of the frame element when in the properly installed position.

4. The device of claim 2, wherein the length of the body is such that, when the device is placed on the frame member with a first lateral end face of the body being remote from a mounting plate placed on the free edge of the frame member during installation, with the first end face of the body, when in the installed position, contacting an adjacent bottom or top cabinet carcase wall located perpendicular to the the frame member, the body covers at least a portion of the mounting plate to thereby hold said portion of the mounting plate within the first recess and to thereby locate the mounting plate in the desired position for installation.

5. The device of claim 2, wherein the first recess forms an indentation in the inside face of each of the limbs, which indentation acts to hold the mounting plate therein when in the proper installed position.

6. The device of claim 1, wherein the device further comprises a clamping means having a releasable clamping element for securing the body to the frame element by way of one of the front and rear sides of the frame element.

7. The device of claim 3, wherein the device further comprises a clamping means having a releasable clamping element for securing the body to the frame element by way of one of the front and rear sides of the frame element, wherein the clamping element is located adjacent a second recess, the second recess opening through one of said limbs into an interior portion of the U-shape between the limbs of the body, the clamping element being in the form of a lever, the lever being pivotable such that in a resting position, the lever rests within the second recess, and in an operable position a first end of the lever extends through the second recess into the interior portion of the U-shape.

8. The device of claim 7, wherein a free second end of the lever projects above an outside face of the web when the lever is in the resting position.

9. The device of claim 8, wherein in a maximum operable position in which the first end of the lever extends to a maximum distance into the space between the limbs of the body, a lateral face of the lever abuts against a bottom edge of the second recess.

10. The device of claim 7, wherein the second end of the lever comprises a handle.

11. The device of claim 7, wherein the first end of the lever has an arcuately rounded cross-section.

* * * * *